United States Patent [19]

Lagerberg

[11] Patent Number: 4,632,606
[45] Date of Patent: Dec. 30, 1986

[54] CUTTING TOOL AND CUTTING INSERT

[75] Inventor: Stig E. V. Lagerberg, Sandviken, Sweden

[73] Assignee: Santrade Limited, Lucerne, Switzerland

[21] Appl. No.: 773,011

[22] Filed: Sep. 6, 1985

[30] Foreign Application Priority Data

Sep. 26, 1984 [SE] Sweden .............................. 8404814

[51] Int. Cl.⁴ .............................................. B26D 1/00
[52] U.S. Cl. ..................................... 407/104; 407/113
[58] Field of Search .............. 407/104, 105, 106, 107, 407/103, 48, 113, 114

[56] References Cited

U.S. PATENT DOCUMENTS 3,902,232  9/1975  Hertel ................................. 407/113
4,298,233  11/1981  Elfgen ................................ 407/113

FOREIGN PATENT DOCUMENTS 2444344  3/1976  Fed. Rep. of Germany ...... 407/105
3204693  8/1983  Fed. Rep. of Germany ...... 407/114
3321184  11/1985  Fed. Rep. of Germany .
142513  7/1980  German Democratic Rep. .................................... 407/106
1363635  8/1974  United Kingdom ............... 407/104
2070472  9/1981  United Kingdom ............... 407/104

Primary Examiner—Leonidas Vlachos
Attorney, Agent, or Firm—Burns, Doane, Swecker & Mathis

[57] ABSTRACT

An indexible insert is mounted on a shank. The insert includes angled centering surfaces which engage angled localizing surfaces on the shank. The insert includes abutment surfaces which engage support surfaces on the shank. The point of contact between the abutment and support surfaces is located farther from the working cutting edge than is the point of contact between the centering and localizing surfaces. Thus, when the working cutting edge is acted upon by a lateral force, the abutment and support surfaces bear against each other with a greater force than do the centering and localizing surfaces. Accordingly, less wear occurs at the centering surfaces.

10 Claims, 8 Drawing Figures

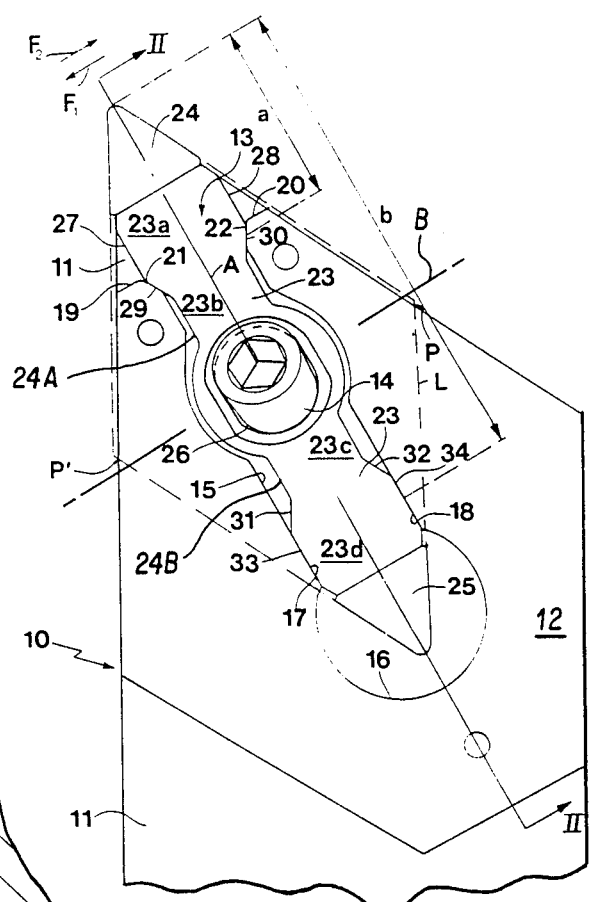
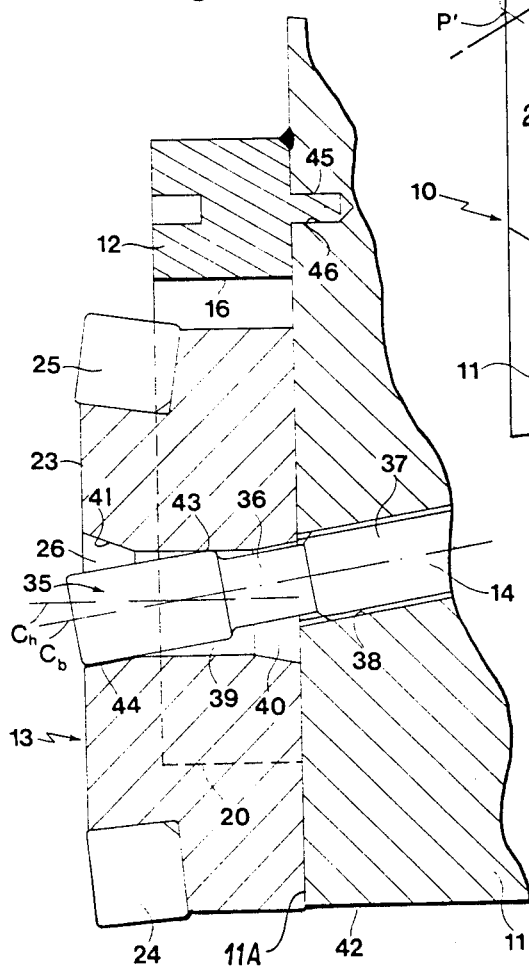

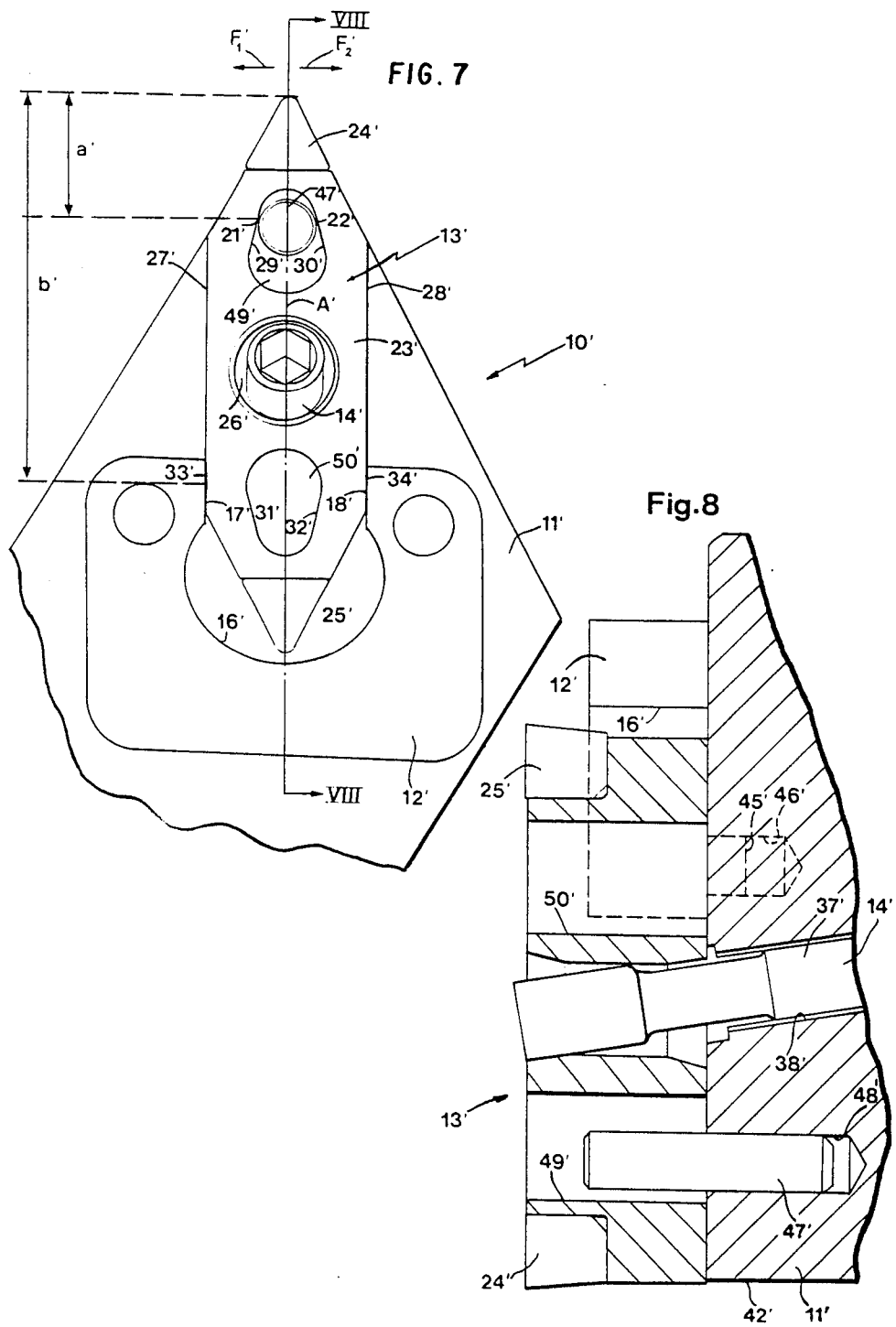

CUTTING TOOL AND CUTTING INSERT

BACKGROUND AND OBJECTS OF THE INVENTION

The invention relates to a cutting tool and a cutting insert, preferably for turning.

A cutting tool for turning is previously known having a rhombical cutting insert, wherein the cutting insert is positioned in a cutting insert site so that two cutting edges are exposed outside the cutting insert holder in order to make right-hand and left-hand turning possible. This means that the distance between the tip of the cutting insert and the support points of the cutting insert against the cutting insert site corresponds approximately to an edge length of the cutting insert. An edge length of the cutting insert is thus the moment arm by which the cutting forces influence the cutting insert site. The support points in the cutting insert site are deformed and displaced with known cutting inserts so that the positioning of a new cutting insert gets less accurate. As the tip of the cutting insert in certain cases describes an arch of a circle-movement an incorrect depth is caused in the work piece.

Accordingly, it is a principal object of the present invention to provide a cutting tool suitable for use with an indexable cutting insert and which minimizes the unwanted movements of the cutting insert in the cutting insert site.

A further object of the present invention is to provide such a cutting tool that minimizes the cutting forces indirectly acting upon the cutting insert site.

Another object of the present invention is to provide such a cutting tool being simple to manufacture.

A still further object of the present invention is to provide such a cutting tool that carries cutting inserts having different cutting edge geometry.

A still further object of the present invention is to provide an indexable cutting insert having a shape being less hard material consuming than heretofore known cutting inserts for turning.

THE DRAWINGS

The invention will be more clearly described in connection with the following drawings in which:

FIG. 1 shows the end of a turning tool and a cutting insert according to the invention in a plane view;

FIG. 2 shows a part of the working end of the tool in cross-section according to the line II—II in FIG. 1;

FIG. 7 shows the turning tool in plane view;

FIG. 8 shows the turning tool in cross-section according to the line VII—VII in FIG. 7.

BRIEF DESCRIPTION OF PREFERRED EMBODIMENTS OF THE INVENTION

Figure 3:
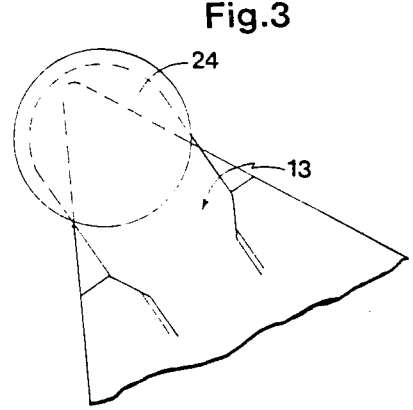
FIGS. 3-5 show the outermost part of the tool, wherein alternate shapes of the cutting insert wafers are secured to the cutting insert body.

FIG. 1 shows the machining end of a turning tool 10 comprising a shank 11, a separate plate 12 with a cutting insert site, a cutting insert 13, and a lock screw 14. The upper side 11A of the shank 11 which is mainly planar is built up with the site-equipped plate 12, which is provided with three guiding pins on its lower side, engaging with pressfit into recesses in the upper side of the shank 11. The guiding pins shall in cooperation with a fastening method, for example gluing or welding, secure the plate 12 to the shank 11.

The plate is formed with a site to receive the cutting insert 13. The site consists of a slot 15, extending in a direction normal to said upper side. The slot 15 ends in the edge of the plate 12 which is turned towards a working cutting insert tip. The slot 15 terminates in a partially circular spacing 16 in its other end, which receives a non-working cutting insert tip. The parts of the walls of the slot which are connected to the spacing 16 constitutes support surfaces 17, 18 for the cutting insert. The support surfaces are parallel with the longitudinal axis A in the figure but they may also be formed completely or partly convex. The support surfaces 17, 18 transite into concave recesses in the area around the lock screw 14 whereafter the slot 15 again tapers to portions which are parallel with the longitudinal axis A. Each portion transites into an edge surface 19, 20 of the plate 12 via localization bevels 21, 22. Each localization bevel 21, 22 forms an acute angle of about 15° with the longitudinal axis A of the cutting insert, which coincides with the bisector of the outermost end of the cutting tool. The plate 12 is suitably shaped through precision punching or moulding.

Figure 4:
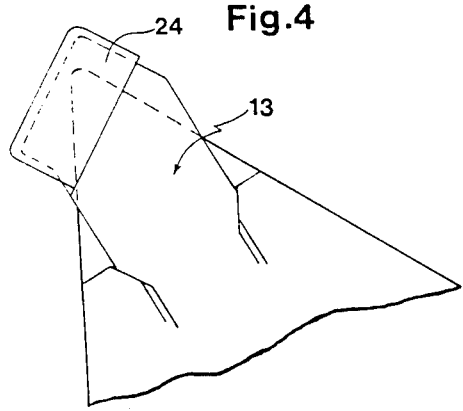
Figure 5:
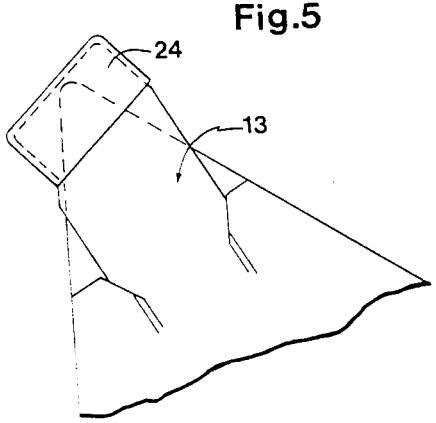

The cutting insert 13 comprises a cutting insert body 23 with a working, hard material wafer 24 and a non-working, hard material wafer 25 and a centrally placed hole 26 for the lock screw 14. The hard material wafers preferably consist of hard metal, ceramics or diamond and they are secured to the body 23 preferably through welding or soldering. The shape of the hard material wafers 24, 25 may vary depending on which machining is wanted. In FIGS. 3, 4 and 5 wafers for different types of machinings are shown. FIG. 3 shows a cutting insert, the wafer of which is circular. The cutting insert is provided for turning with large feed motion and four roundings-off in the work piece. FIGS. 4 and 5 show two roughing steels with different setting angles having different chip directions and cutting forces as a result.

Hitherto known cutting insert holders are limited in the sense that they have a cutting insert site for a cutting insert which is meant for a special machining. This disadvantage advantage is avoided with the present invention as cutting inserts with different cutting edge geometries may be mounted to a sole cutting insert site. The cutting insert 13 in FIG. 1 is identically formed on each side of the longitudinal axis A which coincides with a main axis of the insert. The insert also includes a minor axis B disposed perpendicular to the main axis. The insert is configured symmetrically about the major and minor axes as is depicted in FIGS. 1 and 2. The cutting insert body 23 is widened in V-form under the cutting insert wafer from the tip whereafter a portion 23a is arranged with constant width, whose sides in this position form non-working support surfaces 27, 28. The support surfaces 27, 28 may also be completely or partly convex and therefore said portion 23a achieves an irregular width. The portion 23a tapers thereafter and forms working bevels which define centering surfaces 29, 30 on the cutting insert body 23, which mainly form the same angles with the line II—II as the localization bevels 21, 22 of the plate 12$^{do}$. The localization bevels 29, 30 transite into a narrower waist 23b with constant width. The waist surfaces 24A, 14B thereof merge into a convex portion provided with a hole 26 to receive the lock screw 14. The convex portion is further connected to a narrow waist 23c with constant width, which connects to a broader portion 23d with constant width via non-working centering bevels 31, 32. The sides of the broad portion 23d are working abutment surfaces 33, 34, at the most only one of which engages the associated support surface 17, 18 in the plate 12. This depending on that these parts are not formed with press-fit tolerances as the cutting insert 13 is supposed to be indexed and thus it should be easy to release from the slot 15. The support surfaces 33, 34 may also be completely or partly convex to achieve carefully defined points of contact between the support surfaces 17, 18 and the abutment surfaces 33, 34, respectively. The longer that these support surfaces are arranged from the working hard material wafer the better support is achieved.

FIG. 2 shows a part of the end of the shank 11, in cross section according to the line II—II in FIG. 1, comprising a lock screw 14, consisting of a head 35, a neck 36 and a threaded portion 37, the site-equipped plate 12 and the cutting insert 13. The threaded portion 37 of the screw is in threaded engagement with a threaded bore 38 in the shank 11. The cutting insert 13 is provided with a centrally placed hole 26, the centerline $C_h$ of which is perpendicular to the upper side of the shank 11. The hole 26 has a cylindrical mid-portion 39 and is conically widened at both its ends 40, 41. The bore 38 is inclined in the plane of the cross section which is equal to the plane of the bisector in the end of the shank 11 so that its centerline $C_b$, in a direction upwards towards the upper side of the shank, approaches the front edge 42 of the shank 11. The threaded part 37 of the lock screw 14 has been inwardly screwed into the bore 38, according to the figure, whereafter the cutting insert 13 has been fitted into the site of the plate so that the hole 26 has received the cylindrical head 35 of the lock screw 14. The end 43 of the screw head 35 which is turned towards the shank will, at further inwards screwing of the lock screw, force the cutting insert 13 against the support surfaces of the plate via the cylindrical mid-point whereafter the other end 44 of the screw head 35 which is turned away from the shank will clamp the cutting insert, via the conical end 41 of the hole, against the upper side of the shank mechanically and by means of friction.

When screwing the lock screw inwardly in the shank the centering bevels 29, 30 of the cutting insert 13 abut the localization bevels 21, 22 of the site-equipped plate 12 such that each contact surface between the bevels 29, 30 and 21, 22, respectively, forms an acute angle with the longitudinal axis A of the cutting insert and due to their angled shapes the cutting insert is guided to and kept in a centered position in the end of the shank 11. The fact that said contact surfaces for the cutting insert in the site are arranged close to the working hard material wafer 24, between the lock screw 14 and said wafer, results in that the axial forces acting upon the contact surfaces become less than for example on the points of support p, p' for a rhombical cutting insert, shown as dotted lines in FIG. 1, and therefore the wear on the cutting insert site will be small.

The surfaces 33, 34 and 17, 18 of the cutting insert 13 and the site, respectively, are arranged at a large distance from the working hard material wafer 24, and therefore a small movement at the wafer 24 caused by an axial cutting force wants to give the non-working part of the cutting insert a large movement in a sideways direction which, however, is stopped by one of the support surfaces 17, 18 of the plate. The general distance between the cutting insert tip and the fore contact surfaces between the cutting insert and the site-equipped plate 12 is in FIG. 1 depicted by a, while b depicts the general distance between the cutting insert tip and the rear contact surfaces. The distance b is chosen such that it is more than double the distance a. The longer the distance b the faster the non-working part of the cutting insert body 23 abuts one of the support surfaces 17, 18. At a force $F_1$, the direction of which is given by an arrow in FIG. 1, acting upon the cutting insert 13 the support surface 34 of the cutting insert body 23 abuts the support surface 18 of the plate 12. A force $F_2$ according to an arrow in FIG. 1 will thus cause an abutment of the support surface 33 against the support surface 17. A guiding pin 45 is shown in FIG. 2 which has been press-fitted into a hole 46 in the upper side of the shank 11. The guiding pin 45 has been punched out of the plate 12 with a punch corresponding to a partly carried through punching and thus the upper side of the plate obtains a bottom-hole.

Figure 6:
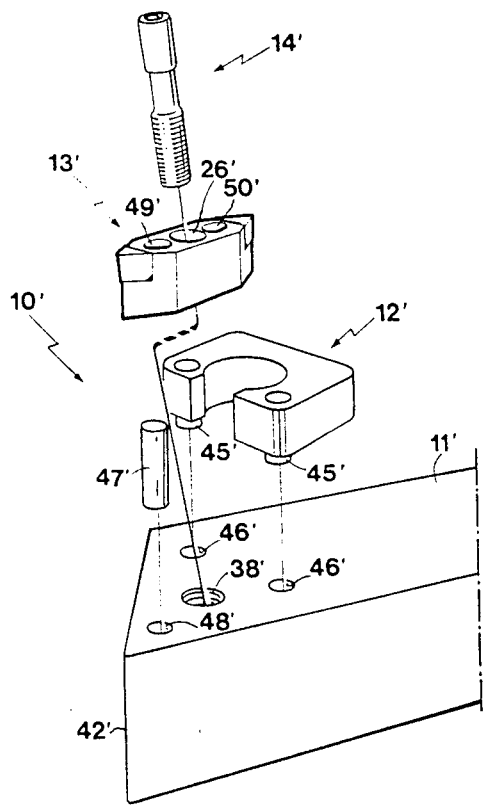
FIG. 6 shows an alternative embodiment of a turning tool and a cutting insert according to the invention in an exploded view.

In FIGS. 6–8 is shown an alternative embodiment of a turning tool according to the invention. The turning tool 10' comprises a shank 11', the head portion of which has a mainly planar upper side in which four bores have been formed, a plate 12' with an insert-receiving site, a cutting insert 13', a lock screw 14' and a mainly cylindrical localization pin 47'. The object of the bores 46' is to receive the two guiding pins 45' of the plate 12' while the bore 38' receives the threaded portion 37' of the lock screw 14'. The bore 38' is angled such that it approaches the front edge 42' of the shank 11' in a direction towards the upper side. A bore 48' extends downwardly mainly perpendicularly relative to the upper side of the shank, which is arranged to receive the pin 47'. The plate 12' has in plan view a mainly rectangular basic form and a traversing slot consisting of a circular spacing 16' which is opened in the edge which is turned towards the tip of the head portion. The walls of the opening form support surfaces 17', 18', whose extensions in the transversal direction of the plate 12' are larger than in the longitudinal direction thereof. The support surfaces 17', 18' may also be convexly formed. The lower side of the plate comprises two guiding pins 45' on each side of the opening, for engagement with corresponding bores in the shank. The plate is intended to be secured to the shank by means of welding or gluing. The cutting insert 13' has a generally rectangular basic form, the peripheries of the short sides of which correspond to the shape of the cutting portion, which in this case have been made pointed. The cutting insert 13' comprises at least two cutting insert wafers 24', 25', a securing hole 26' and two centering holes 49', 50' symmetrical relative to the longitudinal axis A of the cutting insert. The cutting insert wafers 24', 25' are comparable with the ones earlier described in connection with the FIGS. 1–5. The ends of the long sides of the cutting insert 13' include abutment surfaces 27', 28' and 33', 34' of which the ones arranged furthest away from the working cutting insert wafer shall be received in the opening of the plate 12' for abutment on either of the support surfaces 17' or 18'. Each centering hole 49', 50' is formed such that a narrower section thereof is turned towards the cutting insert wafer and a broader section is turned towards the screw 14' so that the radius at the narrower section is smaller than the radius of the localization pin 47', while the radius of the broader section is larger than the radius of the pin. The wall of each hole 49', 50' in a tapering section between the broader and the narrower section constitutes centering surfaces 29', 30' and 31', 32'. The hole 49' which is arranged closest to the working cutting insert wafer 24' shall have its centering surfaces 29', 30' abut against two parts of the envelope surface of the localization pin 47'. The parts constitute localization places 21', 22' which form surface-, point- or line-formed contact places with the centering surfaces 29' and 30', respectively. The centering surfaces 29', 30' form an acute angle of about 30° with each other. The tangent of each localization place 21', 22' form an acute angle with the longitudinal axis A' of the cutting insert.

The screw 14' has the same effect on the cutting insert and shaping as shown earlier in the description. At insertion of the cutting insert 13' over the lock screw 14' and the localization pin 47' in the cutting insert site shown in FIGS. 7 and 8 and inwards screwing of the screw, the abutment surfaces 33', 34' of the cutting insert body 23' will slide against the support surfaces of the plate 12' until the centering surfaces 29', 30' of the hole 49' wedge up against the localization places 21', 22' of the pin 47'. The cutting insert 13' is centered and safely fixed in this position. The distances a' and b' in the embodiment according to FIG. 7 are defined in accordance with FIG. 1. The distance a' is however even shorter than the distance a in FIG. 1, as the contact places between the localization surfaces 21', 29' and 22', 30' have been arranged closer to the cutting insert tip. The distance b' is at least double the distance a', preferably three times. At a force $F_1'$, the direction of which is given by an arrow in FIG. 7, acting on the cutting insert 13', the abutment surface 34' abuts the support surface 18' and at the force $F_2'$ the abutment surface 33' abuts the support surface 17'. A small movement of the tip of the cutting insert with the pin 47' as a rotational centre wants to cause a large movement in the opposite end of the cutting insert. This movement is effectively stopped by the support surfaces of the plate and therefore the cutting insert has a safe attachment. The centering holes 49', 50' may alternatively be formed as bottom-holes with openings in the lower side of the plate 13' and therefore larger cutting insert wafers of the type shown in FIG. 3 may be attached to the cutting insert body. The turning tool 10' has, in addition to what has been mentioned in connection with the turning tool 10 according to FIGS. 1–5, the advantages that the localization points may be arranged very closely to the cutting insert wafer so that the cutting insert achieves a very good support for the cutting forces and that the turning tool 10' is easier to produce.

The cutting inserts shown in the figures comprise cutting edges with positive (FIGS. 6–8) or negative cutting geometry. Cutting edges with positive cutting geometry may with advantage be used in all these cutting inserts and two additional hard material wafers may be fitted in on the lower side of the cutting inserts. The chip surfaces of the hard material wafers may be provided with recesses, grooves or projections for facilitating the chip forming.

Thus, the invention relates to a cutting tool and a cutting insert, preferably for turning, which are formed in such a way that the parts supporting the cutting insert are arranged close to or far from the cutting edge so that the movement of the cutting insert in the cutting insert site becomes utterly small and so that the forces acting on the cutting insert site become small. Furthermore the shape of the cutting insert will result in a substantial saving of the expensive hard material being used for cutting inserts for turning.

I claim:

1. A cutting tool comprising:
   a shank including a planar upper surface defining an insert-receiving site which has a longitudinal axis, said upper surface being bordered by peripheral edge means, with said site extending rearwardly from said edge means, said upper surface carrying:
   a first hole formed therein rearwardly of said edge means,
   a pair of localizing surfaces upstanding on opposite sides of said longitudinal axis forwardly of said first hole, said localizing surfaces spaced equal distances from said longitudinal axis,
   a pair of support surfaces upstanding on opposite sides of said longitudinal axis at locations rearwardly of said first hole, said support surfaces spaced equal distances from said longitudinal axis,
   an indexable cutting insert seated upon said site, said insert being of elongate configuration with a main axis thereof being coincident with said longitudinal axis, and a minor axis thereof extending perpendicularly relative to said main axis, said insert being configured symmetrically relative to both said main and minor axes, opposite ends of said insert lying on said main axis each carrying cutting edge means, a first of said cutting edge means disposed forwardly of a second of said cutting edge means and defining a working cutting edge means, said insert comprising:
   a second hole communicating with said first hole,
   a pair of first centering surfaces disposed on opposite sides of said main axis intermediate said first cutting edge means and said second hole, said first centering surfaces spaced equal distances from said main axis, said last-named distances corresponding to the distances by which said localizing surfaces are spaced from said longitudinal axis,
   a pair of second centering surfaces 31, 32 disposed on opposite sides of said main axis rearwardly of said second hole, said second centering surfaces spaced equal distances from said main axis, said last-named distances corresponding to said distances by which said localizing surfaces are spaced from said longitudinal axis,
   said pair of first centering surfaces spaced from said second hole by the same distance as said pair of second centering surfaces,
   the angular relationship between said pair of first centering surfaces and said main axis being the same as that of said second centering surfaces,
   a pair of first abutment surfaces disposed on opposite sides of said main axis intermediate said first cutting edge means and said second hole, said first abutment surfaces spaced equal distances from said main axis,
   a pair of second abutment surfaces disposed on opposite sides of said main axis rearwardly of said second hole, said second abutment surfaces surfaces spaced equal distances from said main axis,
   the distance by which said first and second abutment surfaces are spaced from said main axis corresponding to the distance by which said support surfaces are spaced from said longitudinal axis, and fastening means extending into said first and second holes for securing said insert to said shank and displacing said insert rearwardly along said longitudinal axis to urge said first centering surfaces against said localizing surfaces, at least one pair of said localizing and centering surfaces being inclined acutely relative to said longitudinal axis such that the contact between said localizing and centering surfaces positions said main axis into coinciding relationship with said longitudinal axis and positions said working cutting edge means in a cutting position to be acted upon laterally during a cutting operation in a manner tending to urge one of said second abutment surfaces against an associated one of said support surfaces on one side of said longitudinal axis with a first force, and simultaneously urge one of said first centering surfaces against an associated one of said localizing surfaces on a side of said longitudinal axis opposite said one side with a second force weaker than said first force.

2. A cutting tool according to claim 1, including a plate secured to said shank, said plate carrying said localizing suraces and said support surfaces, said support surfaces and all of said abutment surfaces extending parallel to said longitudinal axis.

3. A cutting tool according to claim 2, wherein said plate includes a slot in which said insert is disposed.

4. A cutting tool according to claim 2, wherein both of said localizing surfaces and all of said centering surfaces are oriented at an equal acute angle relative to said main axis so as to be convergent toward said holes.

5. A cutting tool according to claim 4, wherein both of said support surfaces and all of said abutment surfaces are oriented parallel to said main axes.

6. A cutting tool according to claim 1, wherein the distance from said working cutting edge means to said second abutment means is at least double the distance from said first cutting edge means to said first centering surfaces.

7. An indexable cutting insert adapted to be mounted to a shank, said insert including:

a body of elongate configuration including a main axis extending between first and second ends of said body, and a minor axis extending perpendicular to said major axis, said insert being configured symmetrically about both said main and minor axes, first and second cutting edge means carried at said first and second ends, respectively, each said cutting edge means including at least a portion thereof oriented obliquely relative to said main axis, a hole formed in said body midway between said ends and situated along said main and minor axes, said hole adapted to receive a fastener for securing the insert to the shank, a pair of first centering surfaces disposed on opposite sides of said axis intermediate said first cutting edge means and said hole, said first centering surfaces facing generally toward said second cutting edge means, said first centering surfaces extending non-parallel to said main axis and non-parallel to each other and adapted to contact correspondingly located localizing surfaces on the shank to center said insert, said first centering surfaces oriented symmetrically relative to said main axis, a pair of second centering surfaces disposed on opposite sides of said main axis intermediate said hole and said second cutting edge means and facing generally toward said first cutting edge means, said second centering surfaces extending non-parallel to said main axis and non-parallel to each other and adapted to contact said correspondingly located localizing surfaces on the shank after said insert has been reversed, said second centering surfaces oriented symmetrically relative to said main axis, said first and second pairs of centering surfaces oriented symmetrically relative to said minor axis, a pair of first abutment surfaces formed on respective outside peripheral edges of said body and disposed on opposite sides of said main axis intermediate said first cutting edge means and said hole, said first abutment surfaces oriented symmetrically and parallel relative to said main axis, a pair of second abutment surfaces formed along outside peripheral edges of said body and disposed on opposite sides of said main axis intermediate said hole and said second cutting edge means and adapted to bear against correspondingly located support surfaces on said shank in response to said first cutting edge means being acted upon by lateral forces, said first abutment surfaces being coplanar with respect to associated ones of said second abutment surfaces located on the same side of said main axis.

8. An indexible cutting insert according to claim 7, wherein each of said outside peripheral edges includes coplanar ones of said first and second abutment surfaces, and a pair of waist surfaces each situated between said hole and a respective one of said coplanar abutment surfaces, said waist surfaces disposed closer to said main axis than said abutment surfaces, a beveled transition between each of said coplanar abutment surfaces and its nearest waist surface being defined by one of said centering surfaces, wherein the centering surfaces of each of said pair of centering surfaces are convergent toward said hole.

9. An indexible cutting insert according to claim 7, including a pair of recesses each disposed between said hole and a respective one of said first and second cutting edge means, said recesses each formed symmetrically about said main axis, and both of said recesses formed symmetrically about said minor axis, each said pair of centering surfaces of each pair of centering surfaces diverging toward said hole and forming acute angles relative to said main axis.

10. An indexible cutting insert according to claim 7, wherein each said cutting edge means comprises a wafer of hard material mounted on an end of said insert.

* * * * *